United States Patent
Frenne et al.

(10) Patent No.: US 9,565,004 B2
(45) Date of Patent: Feb. 7, 2017

(54) TRANSMIT DIVERSITY FOR PRE-CODED RADIO CONTROL SIGNALS

(75) Inventors: Mattias Frenne, Uppsala (SE); Robert Baldemair, Solna (SE); Jung-Fu Cheng, Fremont, CA (US); Dirk Gerstenberger, Vallentuna (SE); Daniel Larsson, Vallentuna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 269 days.

(21) Appl. No.: 13/380,510

(22) PCT Filed: Dec. 15, 2011

(86) PCT No.: PCT/SE2011/051512
§ 371 (c)(1),
(2), (4) Date: Apr. 24, 2014

(87) PCT Pub. No.: WO2013/022393
PCT Pub. Date: Feb. 14, 2013

(65) Prior Publication Data
US 2014/0293880 A1   Oct. 2, 2014

Related U.S. Application Data

(60) Provisional application No. 61/522,077, filed on Aug. 10, 2011.

(51) Int. Cl.
*H04L 5/00* (2006.01)
*H04L 1/00* (2006.01)
(Continued)

(52) U.S. Cl.
CPC .............. *H04L 5/0053* (2013.01); *H04B 7/024* (2013.01); *H04B 7/06* (2013.01); *H04L 1/004* (2013.01); *H04L 1/0072* (2013.01); *H04L 1/0076* (2013.01); *H04L 1/06* (2013.01); *H04L 1/0625* (2013.01); *H04L 5/0058* (2013.01); *H04L 25/03898* (2013.01); *H04L 27/2626* (2013.01);
(Continued)

(58) Field of Classification Search
None
See application file for complete search history.

(56) References Cited

U.S. PATENT DOCUMENTS

2004/0131125 A1* 7/2004 Sanderford et al. .......... 375/261
2005/0128965 A1   6/2005 Seo
(Continued)

FOREIGN PATENT DOCUMENTS

WO   WO 2011/041623   4/2011

OTHER PUBLICATIONS

Author Unknown, TS 36.212, version 10.2.0, Jun. 2011, pp. 1-78.*
(Continued)

*Primary Examiner* — Christopher Crutchfield
(74) *Attorney, Agent, or Firm* — Patents on Demand P.A.; Brian K. Buchheit; Scott M. Garrett

(57) ABSTRACT

Sequences of pre-coded radio control signals are rearranged to enhance diversity transmission. In one example, a sequence of uplink control bits is segmented to form a plurality of groups. The bits of each of the plurality of groups are error correction encoded and encoded into symbols. The symbols are mapped to different ports for diversity transmission through a plurality of ports.

18 Claims, 15 Drawing Sheets

(51) Int. Cl.

| | |
|---|---|
| *H04L 25/03* | (2006.01) |
| *H04L 1/18* | (2006.01) |
| *H04B 7/06* | (2006.01) |
| *H04B 7/02* | (2006.01) |
| *H04L 1/06* | (2006.01) |
| *H04L 27/26* | (2006.01) |
| *H04B 7/04* | (2006.01) |

(52) U.S. Cl.
 CPC ............... *H04B 7/04* (2013.01); *H04L 1/1812* (2013.01); *H04L 5/001* (2013.01)

(56) References Cited

U.S. PATENT DOCUMENTS

| | | | |
|---|---|---|---|
| 2005/0152266 A1* | 7/2005 | Hwang et al. | 370/210 |
| 2008/0134002 A1 | 6/2008 | Yang | |
| 2011/0080876 A1 | 4/2011 | Yin | |
| 2011/0261775 A1* | 10/2011 | Kim et al. | 370/329 |
| 2012/0114046 A1 | 5/2012 | Gordon | |

OTHER PUBLICATIONS

Author Unknown, 3GPP TS 36.211, Revision 10.2.0, Jun. 2011, pp. 1-103.*
Written Opinion, PCT/ISA/220, Telefonaktiebolaget L M Ericsson (PUBL), May 15, 2012, 10 pages.
International Search Report, Application No. PCT/SE2011/051512, dated May 2, 2012, 4 pages.
3GPP TS 36.211, "LTE; Evolved Universal Terrestrial Radio Access (E-UTRA); Physical channels and modulation," Jun. 2011, 105 pages, Version 10.2.0 Release 10, European Telecommunications Standards Institute, Sophia Antipolis Cedex, France.
3GPP TS 136 212, "LTE; Evolved Universal Terrestrial Radio Access (E-UTRA); Multiplexing and channel coding," Jun. 2011, 80 pages, Version 10.2.0 Release 10, European Telecommunications Standards Institute, Sophia Antipolis Cedex, France.
3GPP TS 136 213, "LTE; Evolved Universal Terrestrial Radio Access (E-UTRA); Physical layer procedures," Jun. 2011, 122 pages, Version 10.2.0 Release 10, European Telecommunications Standards Institute, Sophia Antipolis Cedex, France.

* cited by examiner

TRANSMIT DIVERSITY FOR PRE-CODED RADIO CONTROL SIGNALS

CROSS-REFERENCE TO RELATED APPLICATIONS

This application is a National stage of International Application No. PCT/SE2011/051512, filed Dec. 15, 2011, which claims priority to U.S. Provisional Patent Application No. 61/522,077, filed Aug. 10, 2011, which are hereby incorporated by reference.

TECHNICAL FIELD

The present disclosure relates to the field of transmit diversity in radio communication systems and, in particular, to transmit diversity by breaking bits into groups.

BACKGROUND

Transmit diversity seeks to vary the transmission path for different aspects of a radio signal. The diversity may be created by sending two signals at different times, on different frequencies, or from different locations. More complex forms of transmit diversity send variations of a single packet more than once so that a receiver may combine the two signals to reconstruct the original packet. In some transmit diversity systems, the two signals both contain all of the information while in other systems, the two signals each contain a different part of the information. Even if all of the bits are not received from one signal or the other, the original packet might be reconstructed using error correction, depuncturing, maximum likelihood sequence estimation or other techniques.

In Long Term Evolution (LTE), transmit diversity for some signals is provided by dividing a packet into parts. The parts are each sent in a different time slot and on a different subcarrier. In addition, different antennas may be used for the two slots. This provides time and frequency diversity and options for spatial diversity.

LTE uses orthogonal frequency division multiplexing (OFDM) in the downlink and discrete Fourier transform (DFT)-spread OFDM in the uplink. The basic LTE downlink physical resource may thus be seen as a time-frequency grid as illustrated in FIG. 1, where each resource element corresponds to one OFDM subcarrier during one OFDM symbol interval. FIG. 1 is a grid diagram of the LTE downlink physical resource (3GPP TS 36.211, Third Generation Partnership Project Technical Specification No. 36.211).

In the time domain, LTE downlink transmissions are organized into radio frames of 10 ms, each radio frame consisting of ten equally-sized subframes of length $T_{subframe}=1$ ms. FIG. 2 is a diagram of the LTE time domain structure where time moves from left to right across the frame.

The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink (DL) transmissions are dynamically scheduled, i.e., in each subframe the base station transmits control information to the remote terminals to indicate the resource blocks assigned to transmit data to each terminal, in the current downlink subframe. The remote terminals are typically referred to in LTE as user equipment or UE. This control signaling is typically transmitted in the first 1, 2, 3 or 4 OFDM symbols in each subframe. A downlink system with 3 OFDM symbols as control is illustrated in FIG. 3. FIG. 3 is a grid diagram of a DL subframe showing control in the first blocks followed by data traffic, with reference symbols dispersed through the grid.

LTE uses hybrid-ARQ (HARQ), where ARQ refers to Automatic Repeat Request or Automatic Repeat Query, where, after receiving downlink data in a subframe, the terminal attempts to decode it and reports to the base station whether the decoding was successful (acknowledgement, ACK) or not (negative acknowledgment, NACK). In case of an unsuccessful decoding attempt, the base station may retransmit the erroneous data.

Uplink control signaling from the terminal to the base station in LTE consists of hybrid-ARQ acknowledgements for received downlink data; terminal reports related to the downlink channel conditions, used as assistance for the downlink scheduling; and scheduling requests, indicating that a mobile terminal needs uplink resources for uplink data transmissions.

If the mobile terminal has not been assigned an uplink resource for data transmission, the L1/L2 (Layer 1/Layer 2) control information (channel-status reports, hybrid-ARQ acknowledgments, and scheduling requests) is transmitted in uplink resources (resource blocks) specifically assigned for uplink L1/L2 control on Release 8 of the Physical Uplink Control Channel (Rel-8 PUCCH).

FIG. 4 is a grid diagram of a PUCCH showing resources assigned for a signal uplink control message. As illustrated in FIG. 4, these resources are located at the edges of the total available cell bandwidth. Each such resource consists of 12 "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks may be assigned next to the previously assigned resource blocks.

The PUCCH resource blocks are located at the edges of the overall available spectrum to maximize the frequency diversity experienced by the control signaling. In addition, Assigning uplink resources for the PUCCH at other positions within the spectrum, i.e. not at the edges, would fragment the uplink spectrum, making it impossible to assign very wide transmission bandwidths to a single mobile terminal and still retain the single-carrier property of the uplink transmission When carrier aggregation is used in LTE, one uplink carrier is designed to carry the HARQ-ACK/NACK bits for all DL carrier Physical Downlink Shared Channel (PDSCH) transmissions. To enable the possibility to transmit more than four bits of ACK/NACK, PUCCH format 3 may be used. The basis for Format 3 is DFT-pre-coded OFDM, as diagrammed in FIG. 5 described below.

If the number of ACK/NACK bits is up to 11, then the multiple ACK/NACK bits (which may also include scheduling request (SR) bits) are Reed-Müller (RM) encoded to form 48 coded bits. The coded bits are then scrambled with cell-specific sequences. 24 bits are transmitted within the first slot and the other 24 bits are transmitted within the second slot. The 24 bits per slot are converted into 12 QPSK symbols, spread across five DFTS (DFT Spread)-OFDM symbols using an orthogonal cover code, DFT pre-coded and transmitted within one resource blocks (bandwidth) and five DFTS-OFDM symbols (time). The spreading sequence is specific to each terminal (UE) and enables multiplexing of up to five users within the same resource blocks.

For the reference signals, cyclic shifted constant amplitude zero autocorrelation (CAZAC) sequences are used. This is shown as a processing diagram in FIG. 5 in which input bits are encoded, scrambled and modulated, then applied to weighting multiplexers and DFTs. The DFTs are applied to inverse fast Fourier transform (IFFT) blocks as shown. This is the DFTS-OFDM based PUCCH format 3 for a UE supporting more than 4 HARQ bits in normal contention period (CP) subframes.

The bandwidth of one resource block during one subframe is too large for the control signaling needs of a single terminal. Therefore, to efficiently exploit the resources set aside for control signaling, multiple terminals may share the same resource block. This is done by assigning the different terminals different orthogonal phase rotations of a cell-specific length-12 frequency-domain sequence and/or different orthogonal time-domain covers covering the subframes within a slot or subframe.

If the number of ACK/NACK bits exceeds 11, then the bits are split into two parts and two RM encoders are used, one for each part respectively. This is known as the dual-RM code. Up to 20 ACK/NACK bits (plus one SR bit) may therefore be supported by PUCCH Format 3. Each encoder in the dual-RM code outputs 24 bits which are converted to 6 quaternary phase-shift keying (QPSK) symbols per slot and the two sets of 6 QPSK symbols are interleaved over the subcarriers so that the first encoder maps its 6 symbols onto odd subcarriers and the second encoder onto even subcarriers. These 12 QPSK symbols are then spread across the five DFTS-OFDM symbols using one out of five orthogonal cover codes, as in the single-RM code case. The encoding and multiplexing are diagrammed in FIGS. 6A and 6B.

FIG. 6A shows encoding and multiplexing up to 11 uplink control information (UCI) bits into slot 0 and slot 1. FIG. 6B shows segmenting 12-21 UCI bits into Segment 1 and Segment 2. These are encoded and mapped to 12 QPSK symbols and then to slot 0 and slot 1.

In LTE Release 10, space orthogonal transmit diversity is used for PUCCH Format 3 to achieve transmit diversity. Transmission with two antenna ports is supported and the Format 3 encoding and mapping shown in FIG. 5 is repeated for each of the two antennas apart from the cyclic shift of the reference signals and the orthogonal cover codes on the data, which are different to provide orthogonality between the antenna ports.

SUMMARY

It is an object to improve the reception of signals transmitted with diversity in a radio communications system by adapting the way in which symbols are mapped into the diverse transmission modes.

Sequences of pre-coded radio control signals are rearranged to enhance diversity transmission. In one example, a sequence of uplink control bits is generated. The bit sequence is segmented to form a plurality of groups. The groups of bits are encoded in error connection encoders. The bits of each of the plurality of groups are then encoded into symbols. The symbols are mapped to different ports for diversity transmission through a plurality of ports.

In another embodiment, a radio terminal communicates uplink control information from the radio terminal to a serving node of the radio communications system. The radio terminal includes a bit segmentation unit to segment the bit sequence into a plurality of groups, an error correcting encoder to apply error corrected to each group of bits, a symbol, encoder to map the bits of each of the plurality of groups into symbols, and a mapper to map the symbols, to different ports for diversity transmission through a plurality of ports.

Transmit diversity performance is enhanced with a combination of segmentation, encoding and mapping. The effects of cross-channel interference and multi-path interference may be reduced.

BRIEF DESCRIPTION OF THE DRAWINGS

The present disclosure may best be understood by referring to the following description and accompanying drawings.

DETAILED DESCRIPTION

Figure 1:
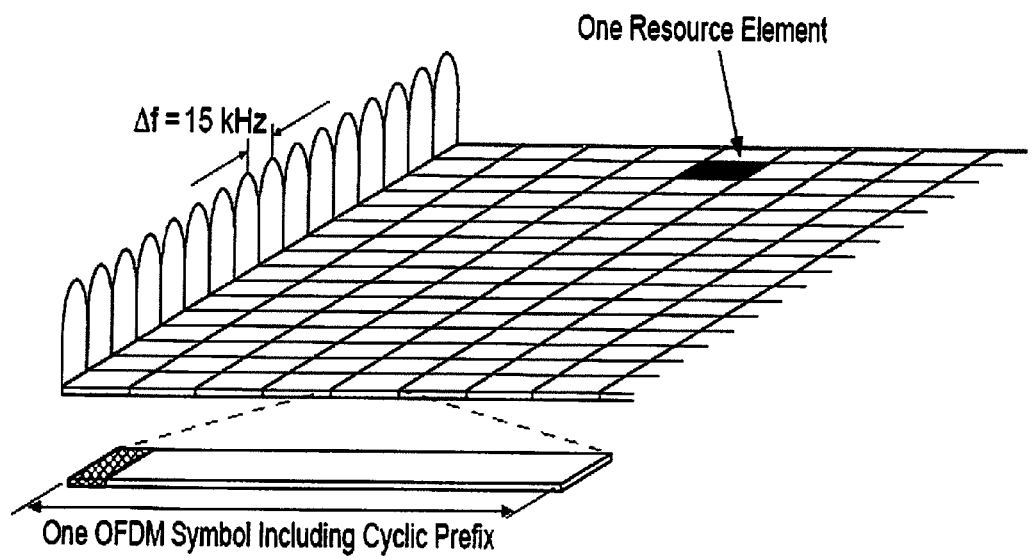
FIG. 1 is a grid diagram of an LTE downlink physical resource.
Figure 2:
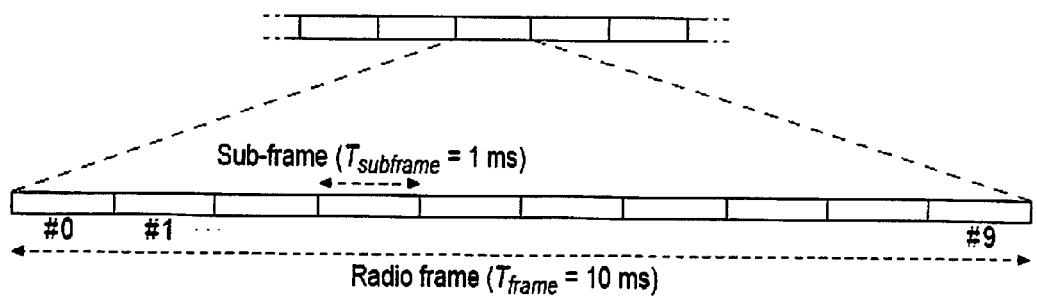
FIG. 2 is a line diagram of an LTE frame and subframe of the time domain structure.
Figure 3:
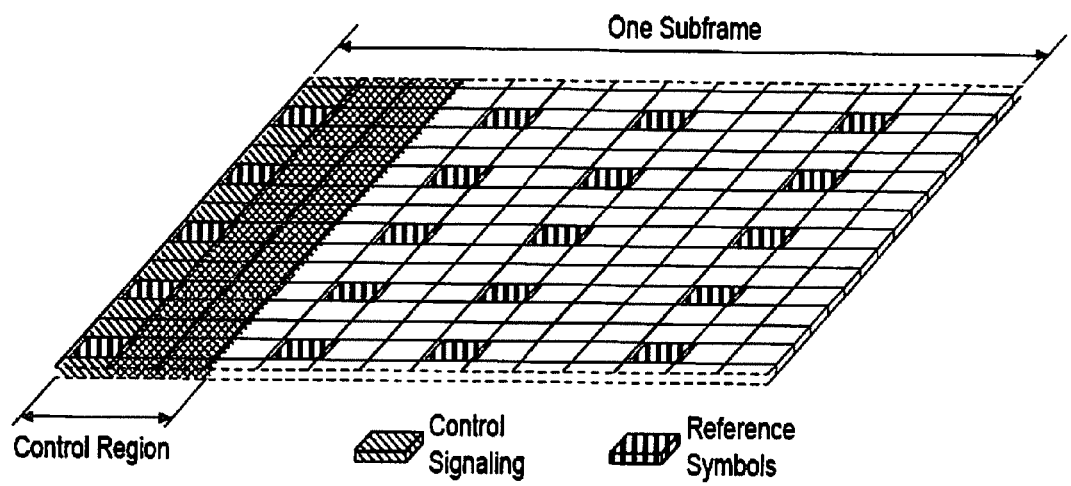
FIG. 3 is a grid diagram of an LTE downlink subframe showing control and data.
Figure 4:
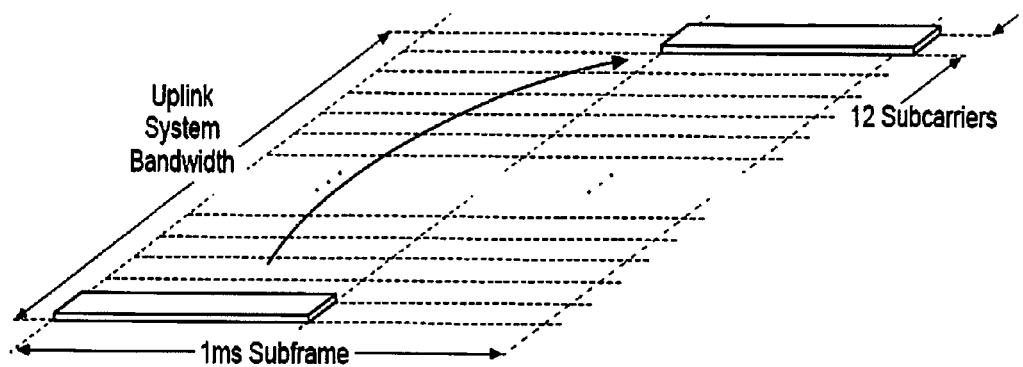
FIG. 4 is a grid diagram of an LTI uplink subframe showing control and data.
Figure 5:
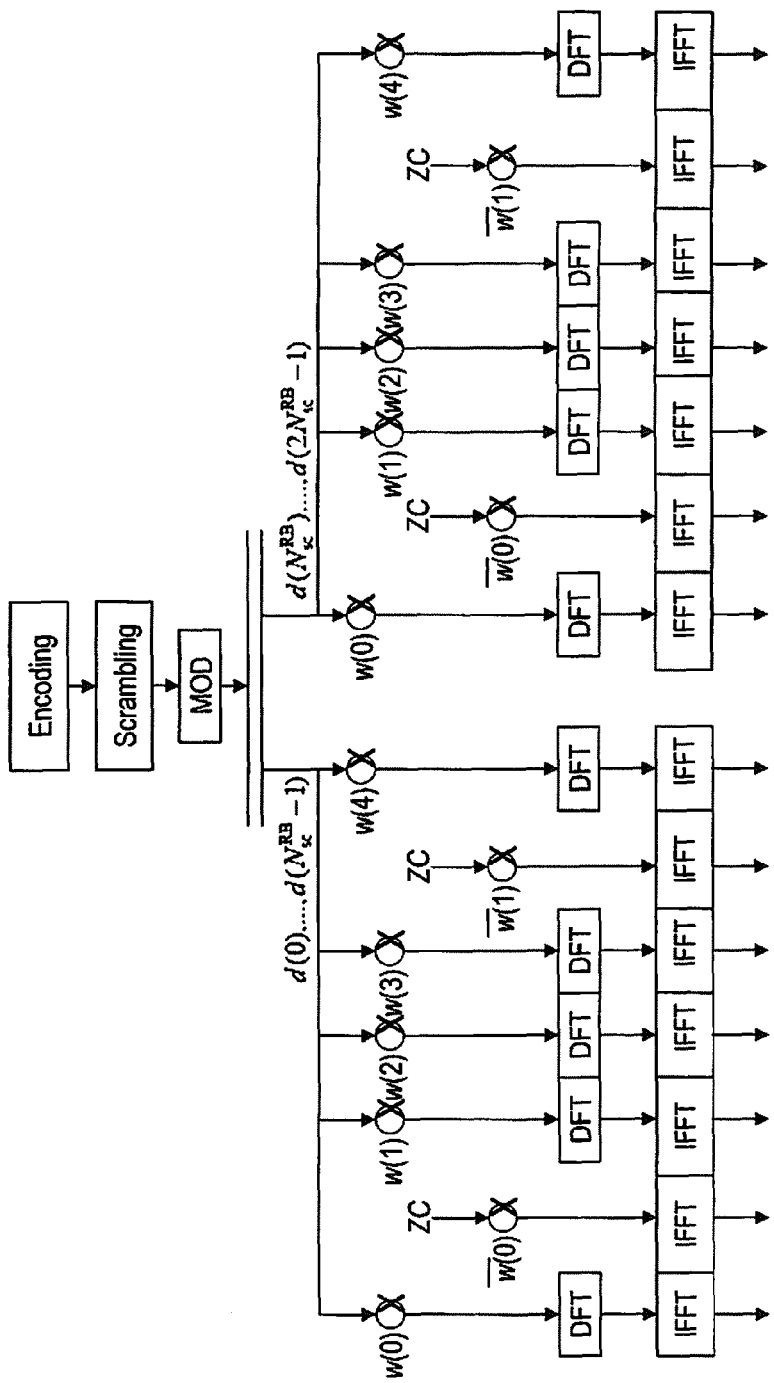
FIG. 5 is a processing diagram of generating discrete Fourier transform pre-coded orthogonal frequency division multiplexed symbols for LTE PUCCH Format 3.

In the following description, numerous specific details such as logic implementations, opcodes, means to specify operands, resource partitioning/sharing/duplication implementations, types and interrelationships of system components, and logic partitioning/integration choices are set forth. It will be appreciated, however, by one skilled in the art that the different implementations may be practiced without such specific details. In other instances, control structures, gate level circuits and full software instruction sequences have not been shown in detail in order not to obscure the description.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A user may communicate using user equipment (UE) via a communications system and send and receive data to other UEs in the system or outside the system. Access to the communications system may be provided by a fixed line or wireless communication interface, or a combination of these. Examples of wireless access systems providing mobility for UEs include cellular access networks, various wireless local area networks (WLANs), wireless personal area networks (WPANs), satellite based communication systems and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol. Various functions and features are typically arranged in a hierarchical or layered structure, so called protocol stack, wherein the higher level layers may influence the operation of the lower level functions.

In cellular systems, a network entity in the form of a base station provides a node for communication with mobile devices in one or more cells or sectors. In certain systems, a base station is called 'Node B'. Typically the operation of a base station apparatus and other apparatus of an access system required for the communication is controlled by a particular control entity, such as a base station controller, mobile switching center, or packet data support node.

The present disclosure is described in the context of the third generation (3G) mobile communications systems of the universal mobile telecommunications system (UMTS) and, in particular, long term evolution (LTE). A particular example of LTE is the Evolved Universal Terrestrial Radio Access (E-UTRA). An Evolved Universal Terrestrial Radio Access Network (E-UTRAN) includes E-UTRAN Node Bs (eNBs) which are configured to provide base station and control functionalities. However, the invention is not so limited.

In the following description and claims, the terms "UE" and "User Equipment" are used to refer to remote terminals, mobile devices or radios, subscriber equipment and any other type of mobile device that may connect to more than cell and experience a handover. The term "handover" also includes "handoff." The term "eNB" or "cell" is used generally to refer to a base station, an access point, a fixed terminal and similar devices and to the area of radio coverage of a base station, a cell, or a sector. The description is presented in the context of LTE for illustration purposes, but the invention is not so limited.

Overview

Figure 7:
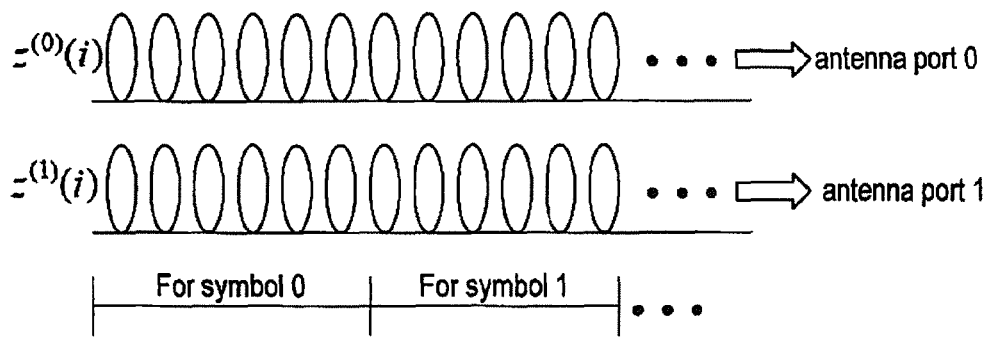
FIG. 7 is a diagram of transmission of a single-carrier FDMA transmission using odd-indexed carriers for on antenna and even-indexed carrier for the other antenna.

In one alternative approach to physical uplink control channel (PUCCH) format 3 transmit diversity, multiple antenna ports are used with a single RM code. This requires only a single orthogonal cover code per transmitter even though two transmit ports are used. In this approach, the signals may be made orthogonal through a distributed single carrier-frequency division multiple access (SC-FDMA) modulation technique. FIG. 7 is a diagram of this approach for the case of two antennas, where the DFT-S-OFDM PUCCH signal for antenna port 0 occupies the even-indexed subcarriers and that for antenna port 1 occupies the odd-indexed subcarriers. The even-indexed symbols in the first output block are obtained as the DFT values of the even-indexed input symbols. The odd-indexed symbols in the first output block are set to zero. The odd-indexed symbols in the second output block are obtained as the DFT values of the odd-indexed input symbols. The even-indexed symbols in the second output block are set to zero.

To enhance the coverage of the PUCCH Format 3 channel, diversity may be increased by frequency hopping and/or antenna diversity. Transmit diversity schemes that use a single resource block or single antenna are simple and efficient, but have poor performance and inferior diversity order when combined with the Release 10 encoder and modulator structure.

Specifically, if the SC-FDMA transmit diversity method described above is straightforwardly combined with the dual RM encoding of PUCCH format 3, then no transmit diversity at all is obtained. This is because the first codeword is always mapped to odd subcarriers which are transmitted by the first one of the two available antennas. Similarly, the second codeword is always mapped to the even subcarriers which are transmitted by the second of the two available antennas. As a result, neither codeword can capture spatial diversity benefits. As a result, the diversity order of a PUCCH Format 3 transmission is greatly reduced for approaches that have the same resource overhead as in the single antenna case.

The disclosed encoder, modulator and transmit diversity methods ensures that the codeword to subcarrier mapping in both a single and a multiple encoder case is such that codewords are mapped to both available antenna ports and that the output bits of each encoder are re-arranged (interleaved) for improved performance.

Six different versions are described. Versions 1 to 5 are applicable for PUCCH signals transmitted by two transmit antennas. Versions 5 and 6 are applicable for PUCCH signals transmitted by a single transmit antenna.

Version 1

For Acknowledgment/Negative Acknowledgment (A/N) or A/N and Scheduling Request (SR) transmission using a dual RM encoder, this first version provides good diversity with low resource overhead. While a RM encoder is currently used in LTE, the particular type of error detecting or error correction code is not essential to the invention and other encoding types may be used depending on the particular implementation. A bit segmentation unit or interleaver is introduced after each RM encoder. The output stream of 24 bits from each segmentation unit is divided into two segments of 12 bits for transmission in each of the two slots, respectively. The further processing in each slot is similar.

For each slot, a set of 12 QPSK modulation symbols are generated and the 12 first and second segmentation unit output bits are mapped to the real and imaginary axis respectively. Then further processing follows the SC-FDMA approach described above. For instance; an extended transform coding block takes in a block of 12 complex-valued symbols and outputs two blocks of 12 complex-valued DFT-domain symbols.

The even-indexed symbols in the first output block are obtained as the DFT values of the even-indexed input symbols. The odd-indexed symbols in the first output block are set to zero.

The odd-indexed symbols in the second output block are obtained as the DFT values of the odd-indexed input symbols. The even-indexed symbols in the second output block are set to zero.

The first output block is then transmitted from the first antenna port and the second output block is transmitted from the second antenna port.

Figure 6A:
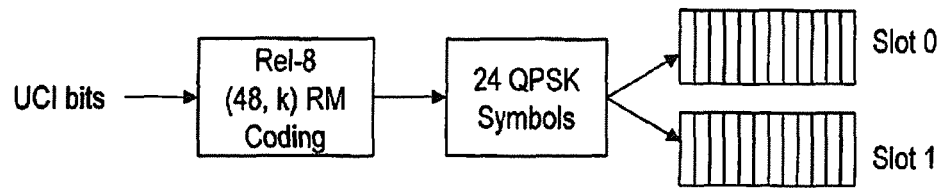
FIG. 6A is a block diagram of an LTE system to multiplex up to 11 uplink control information bits into two different time slots.
Figure 6B:
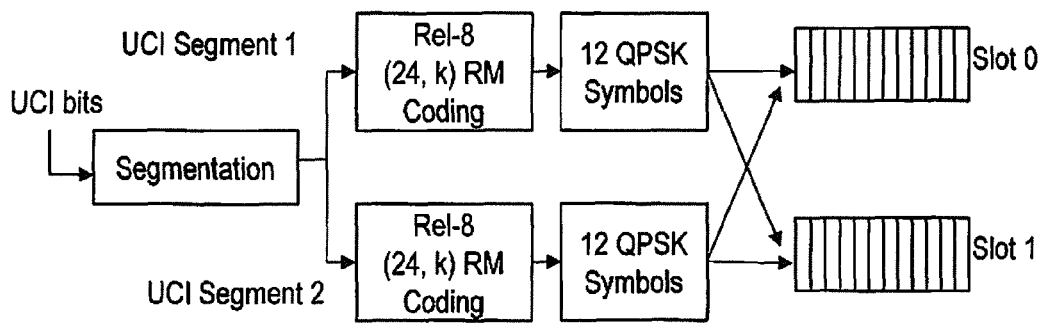
FIG. 6B is a block diagram of an LTE system to multiplex up to 21 uplink control information bits into two different time slots using segmentation.

Effectively this arrangement will ensure that the bits belonging to the same codeword are in each slot and transmitted from both antennas since the real and imaginary axis of the QPSK symbol is used. These operations may be performed in hardware similar to that of FIG. 6B which may be implemented in a general controller or dedicated specialized hardware.

Figure 8:
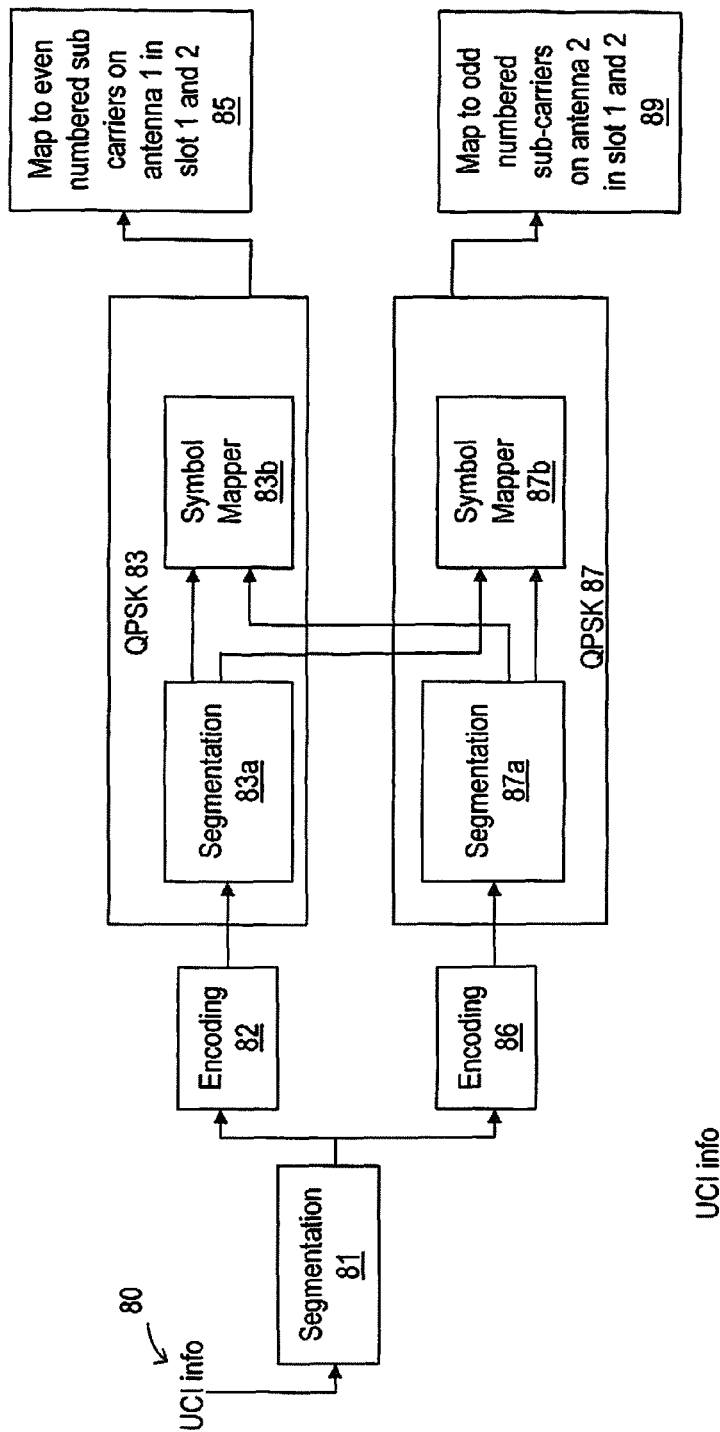
FIG. 8 is a block diagram of a system to encode and map UCI bits onto odd and even numbered subcarriers according to a first embodiment.

FIG. 8 shows an example hardware configuration for implementing version 1 as described above. The hardware may be implemented in a controller or in a dedicated encoder depending on the particular implementation. At the left, uplink control information (UCI) 80 enters as a stream of bits or as packets to a bit segmentation unit 81. The UCI is generated by the UE in a controller 715 as shown in FIG. 7 or in other equipment as is well-known in the art.

The bit segmentation unit sends half the bits into one segment and the other half into the other segment. Each segment is fed into a respective RM or other type of error correcting decoder encoder 82, 86. The output of each RM encoder is fed into a respective QPSK block 83, 87, that functions to map encoded bits to QPSK symbols. In each block, the respective encoder output is segmented each into two segments by a bit segmentation unit 83a, 87a. In one example, there are 24 bits from each encoder, so each segment has 12 bits, the odd bits are in one segment and the even bits are in the other segment. These four groups of bits are fed to QPSK symbol mappers 83b, 87b within the QPSK.

As mentioned above, the bits are mixed to create the QPSK symbols. QPSK allows two bits to be encoded as a single symbol by mapping one bit to the horizontal or real axis and the other to the vertical or imaginary axis. As shown, the odd bits of the upper segmentation engine 83a are applied to the upper QPSK symbol mapper 83b. They are mapped to the real axis in the encoder. The even bits of the lower segmentation unit 87a are applied also to the upper QPSK symbol mapper 87b. These bits are mapped to the imaginary axis. As a result, from the two sets of 12 bits, 12 QPSK symbols are produced from the upper QPSK encoder 83. The lower QPSK encoder 87 works similarly. The bits in both groups are interleaved between the two paths on an odd even basis.

The two sets of symbols are then mapped in mappers 85, 89, respectively into two slots each. Each pair of two slots is sent in a different element, respectively of a transmit diversity antenna. One group of symbols is sent on the even numbered subcarriers and the other group of symbols is sent on the odd subcarriers. The even subcarriers are sent on one antenna and the odd subcarriers are sent on the other antenna.

Version 2

For A/N or A/N and SR transmission using a dual RM encoder, a second version may be used. For each slot, a set of 6 QPSK modulation symbols are provided from the segmentation unit through the RM encoders. These may be denoted as A0, . . . A5 and B0, . . . B5, respectively. Interleave these to obtain the two new sets A0, B0, A2, B2, A4, B4 and A1, B1, A3, B3, A5, B5. Then further processing with an extended transform coding block takes in a block of the 6 complex-valued symbols in each of these two new sets and outputs a block of 6 complex-valued DFT-domain symbols per set.

On odd subcarriers within the PUCCH RB, the 6 complex-valued BFT-domain symbols from the first interleaver output are transmitted from the first antenna port. On even subcarriers within the PUCCH RB, the 6 complex-valued DFT-domain symbols from the second interleaver output are transmitted from the second antenna port.

Effectively this arrangement ensures that the bits belonging to the same codeword are in each slot and transmitted from both antennas since the first codeword is transmitted using subcarriers 4n, 4n+1 and the second codeword is using subcarriers 4n+2, 4n+3 where n=0, 1, 2. These operations may be performed in hardware similar to that of FIG. 6B which may be implemented in a general controller or dedicated specialized hardware.

Figure 9A:
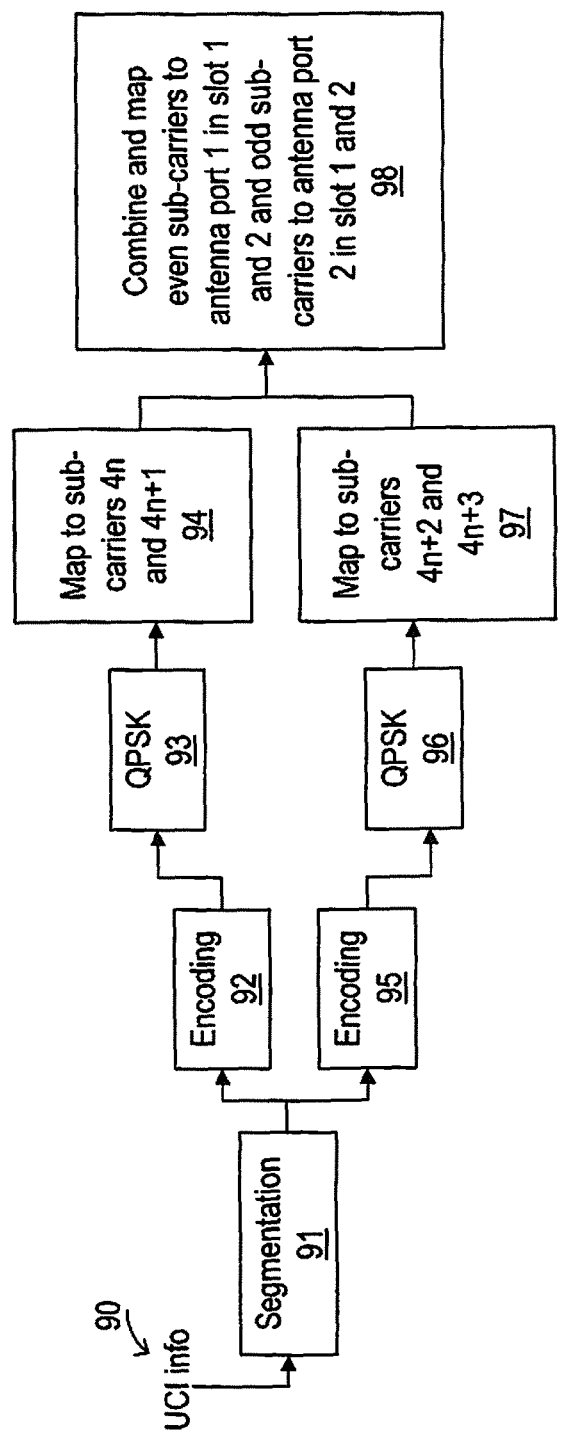
FIG. 9A is a block diagram of a system to encode and map UCI bits onto odd and even numbered subcarriers according to a second embodiment.

FIG. 9A is a hardware block diagram for encoding according to version 2. In FIG. 9A, UCI information bits 90 are again applied to a segmentation unit 91 to create two segments and each segment is RM encoded in a respective RM of other type of error correction encoder 92, 95. The resultant encoded bits are each encoded as QPSK symbols in respective symbol encoders 93, 96. In the example above, 24 encoded bits from each segment are encoded into 12 QPSK symbols from each segment.

The two groups are then each applied to respective mappers 94, 97. The upper group is mapped 94 to the first two subcarriers (4n, 4n+1) and the lower group from encoder 97 is mapped to the second two subcarriers (4n+2, 4n+3). This is done using the interleaving described above to change the order of the symbols and improve diversity. The two segments are then interleaved in a combiner 98 over the antennas by applying the odd numbered subcarriers to one antenna and the even numbered subcarriers to the other antenna.

Figure 9B:
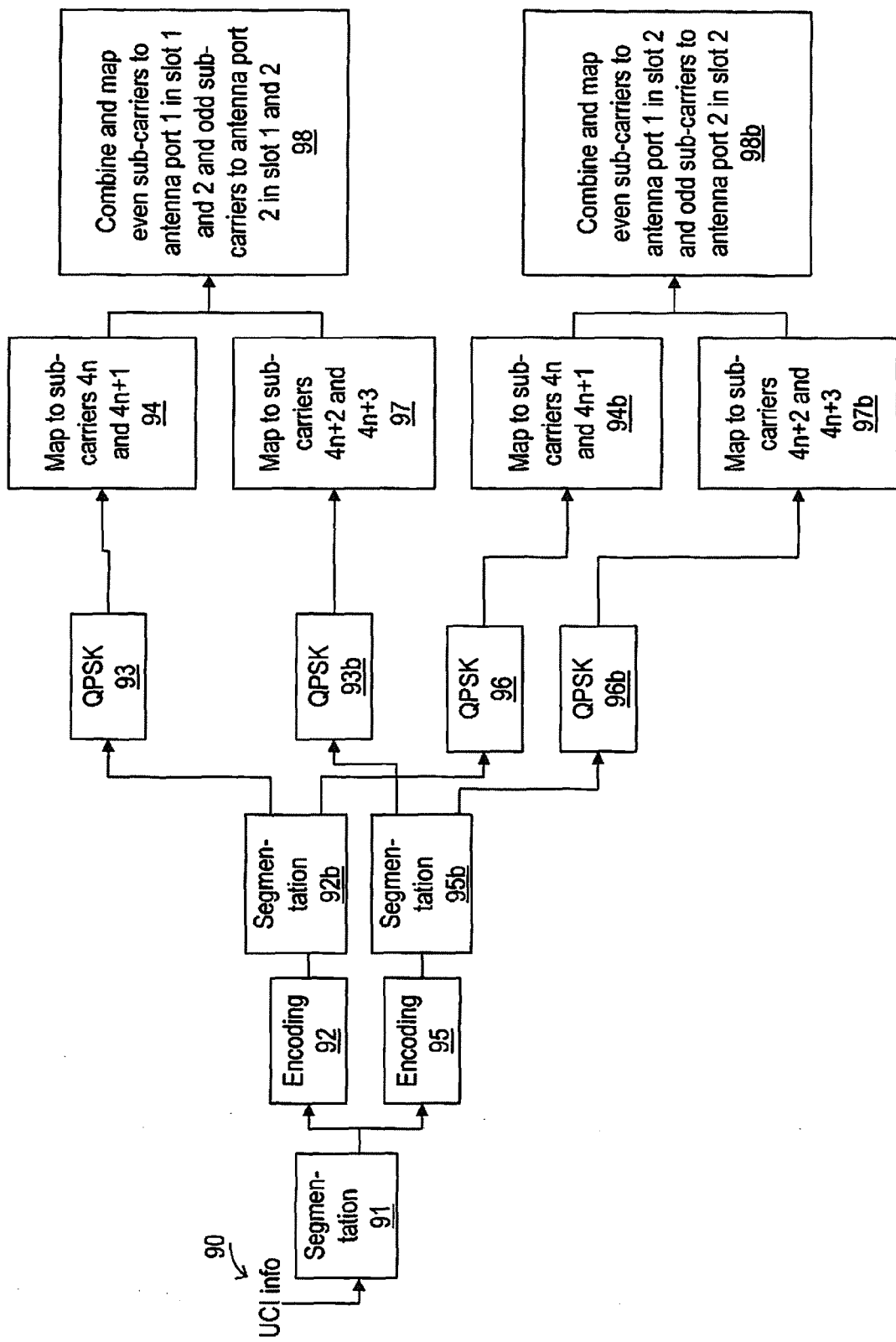
FIG. 9B is a block diagram of an alternative system to encode and map UCI bits onto odd and even numbered subcarriers according to the second embodiment.

In a further alternative for A/N or A/N and SR transmission shown in FIG. 9B the dual RM encoder 92, 95 is followed by another bit segmentation unit or interleaver 92b, 95b that is introduced after each RM encoder. UCI information bits 90 are again applied to a segmentation unit 91 to create two segments and each segment is RM encoded in a respective RM of other type of error correction encoder 92, 95. These segments are each applied to a secondary interleaver. The output stream of 24 bits from the two secondary interleavers is divided into two segments of 12 bits for transmission in each of the two slots, respectively, for a total of four segments, two for each slot.

The bit segments are converted into QPSK modulation symbols using an encoder 93, 93b, 96, 96b for each of the four output segments, resulting in four sets of 6 QPSK modulation symbols. As above, these may for a given slot be denoted as A0, . . . A5 and B0, . . . B5, respectively. These are interleaved by a set of four mappers 94, 94b, 97, 97b to obtain the two new sets A0, B0, A2, B2, A4, B4 and A1, B1, A3, B3, A5, B5. Then further processing with the two combiners acting as extended transform coding blocks 98, 98b takes in a block of the 6 complex-valued symbols in each of these two new sets and outputs a block of 6 complex-valued DFT-domain symbols per set.

As in the example of FIG. 9A, the bits belonging to the same codeword are in each slot and transmitted from both antennas since the first codeword is transmitted using subcarriers 4n, 4n+1 and the second codeword is using subcarriers 4n+2, 4n+3 where n=0, 1, 2. These operations may be performed in hardware similar to that of FIG. 6B which may be implemented in a general controller or dedicated specialized hardware.

Version 3

For A/N or A/N and SR transmission using a dual RM encoder, version 3 may be used. For each slot, a set of 6 QPSK modulation symbols are output to an extended transform coding block that takes in a block of the 6 complex-valued symbols in each of these two sets and outputs a block of 6 complex-valued DFT-domain symbols per set.

On odd subcarriers within the PUCCH RB, the 6 complex-valued DFT-domain symbols from the first interleaver output are transmitted. On even subcarriers within the PUCCH RB, the 6 complex-valued DFT-domain symbols from the second interleaver output are transmitted. The first antenna port is used on subcarrier 4n, 4n+1 and the second antenna port is using subcarriers 4n+2, 4n+3 where n=0, 1, 2.

Effectively this arrangement ensures that the bits belonging to the same codeword are in each slot and transmitted from both antennas since the first codeword is transmitted using odd subcarriers and the second codeword is transmitted using even subcarriers but both odd and even subcarriers are mapped to each antenna port. These operations may be performed in hardware similar to that of FIG. 6B which may be implemented in a general controller or dedicated specialized hardware.

Figure 10A:
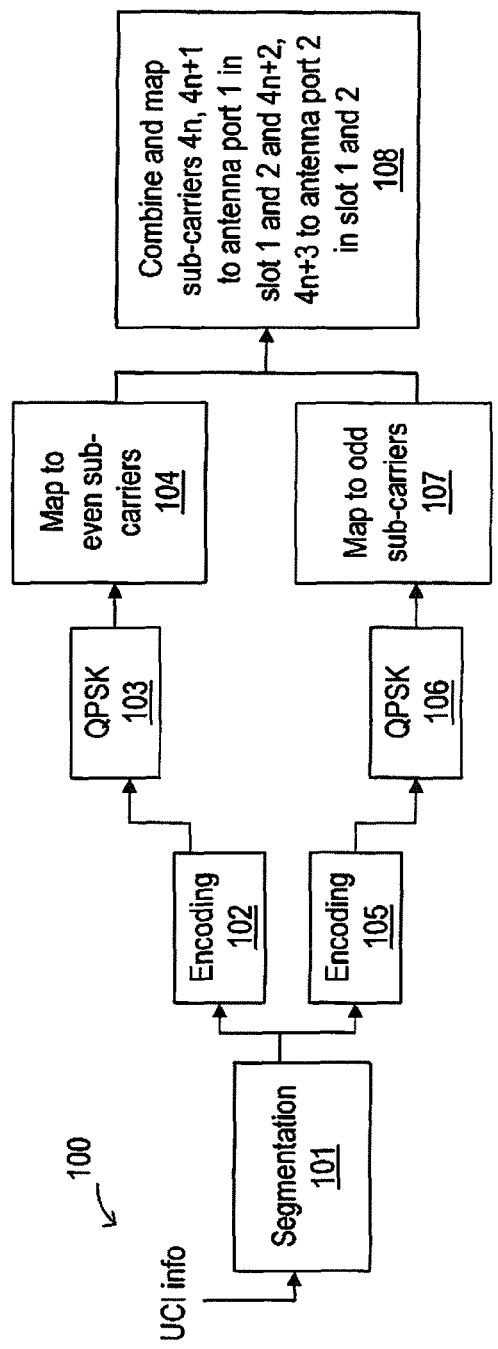
FIG. 10A is a block diagram of a system to encode and map UCI bits onto odd and even numbered subcarriers according to a third embodiment.

FIG. 10A is a hardware block diagram of hardware or firmware suitable for implementing version 3. In FIG. 10A UCI information 100 is again applied to a segmentation engine 101 to create two feeds into respective RM encoders 102, 105. The products of these encoders are each applied to a respective QPSK encoder 103, 106. The hardware is the same as that of FIG. 9. Each symbol sequence is then mapped in respective mappers 104, 107 to even and odd subcarriers, respectively. The nature of the mapping is described above.

The even and odd subcarriers are then combined for transmission in a combiner 108. In this case, the first and second subcarriers are mapped to the first antenna and the second and third subcarriers are mapped to the second antenna.

Figure 10B:
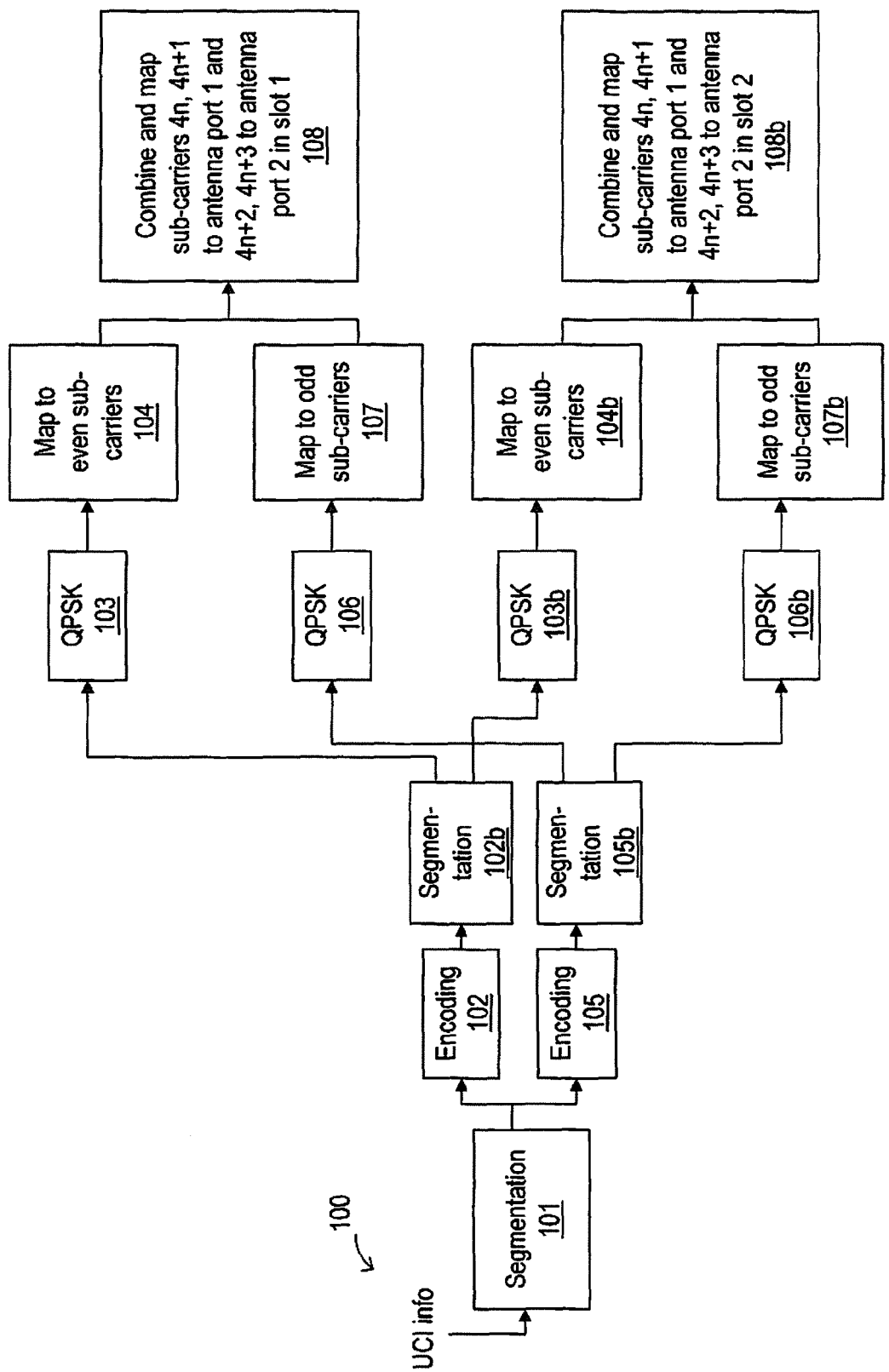
FIG. 10B is a block diagram of an alternative system to encode and map UCI bits onto odd and even numbered subcarriers according to a third embodiment.

For A/N or A/N and SR transmission using the dual RM encoder of FIG. 10B, an alternate to version 3 may be used. In this alternate version, a bit segmentation unit or interleaver 102b, 105b is introduced after each RM encoder 102, 105. The UCI information 100 is again applied to a segmentation engine 101 to create two feeds, one for each RM encoders 102, 105. The products of these encoders are each applied to the secondary segmentation units 102b, 105b. The output stream of 24 bits from each segmentation unit is divided into two segments of 12 bits for transmission in each of the two slots respectively. The further processing in each slot is similar.

Each of the four 12 bit segments is applied to one of a set of QPSK encoders 103, 103b, 106, 106b to produce four respective sets of 6 QPSK modulation symbols. The four symbol sets are applied to mappers 104, 104b, 107, 107b in the form of extended transform coding blocks that output a block of 6 complex-valued DFT-domain symbols per set. These blocks are then allocated to even and odd subcarriers as in combiners 108, 108b.

One of the combiners 108 combines blocks for slot 1. It receives two blocks, one based on bits from the one of the secondary segmentation units 102b, and the other from the other of the secondary segmentation units 105b. These are combined and mapped to the two antenna ports as in FIG. 10A, i.e. subcarriers 4n and 4n+1 where n=0, 1, 2 are mapped to antenna port 1 in slot 1 while subcarriers 4n+2 and 4n+4 are mapped to antenna port 2 in slot 1.

Similarly, the interleaving pattern provides that the other one of the combiners 108b combines blocks for slot 2. It receives two blocks, one based on the alternate set of bits from the one of the secondary segmentation units 102b, and the other from the alternate set of bit from the other of the secondary segmentation units 105b. These are combined and mapped to the two antenna ports as in FIG. 10A, i.e. subcarriers 4n and 4n+1 where n=0, 1, 2 are mapped to antenna port 1 in slot 2 while subcarriers 4n+2 and 4n+4 are mapped to antenna port 2 in slot 2. As in FIG. 10A, the first antenna port is using subcarrier 4n, 4n+1 and the second antenna port is using subcarriers 4n+2, 4n+3.

Version 4

For A/N or A/N and SR transmission using a dual RM encoder version 4 may also be used. In version 4, the bit segmentation unit or interleaver used in any of versions 1 to 3, may be used. The output stream of 24 bits from each interleaver is divided into two parts of 12 bits for transmission in each of the two slots respectively. The bits in each slot may be further divided into two parts of 6 bits respectively. Hence the output stream of 24 bits has been divided into 4 segments of 6 bits each.

The Rel-10 LTE Format 3 PUCCH achieves full frequency hopping diversity for payload sizes up to 20 bits. However, for payload size of 21 bits, full frequency diversity is not achieved because the RM codeword carrying 11 bits fails to provide nonzero Hamming distances in both hops. Version 4 provides better performance.

Figure 11:
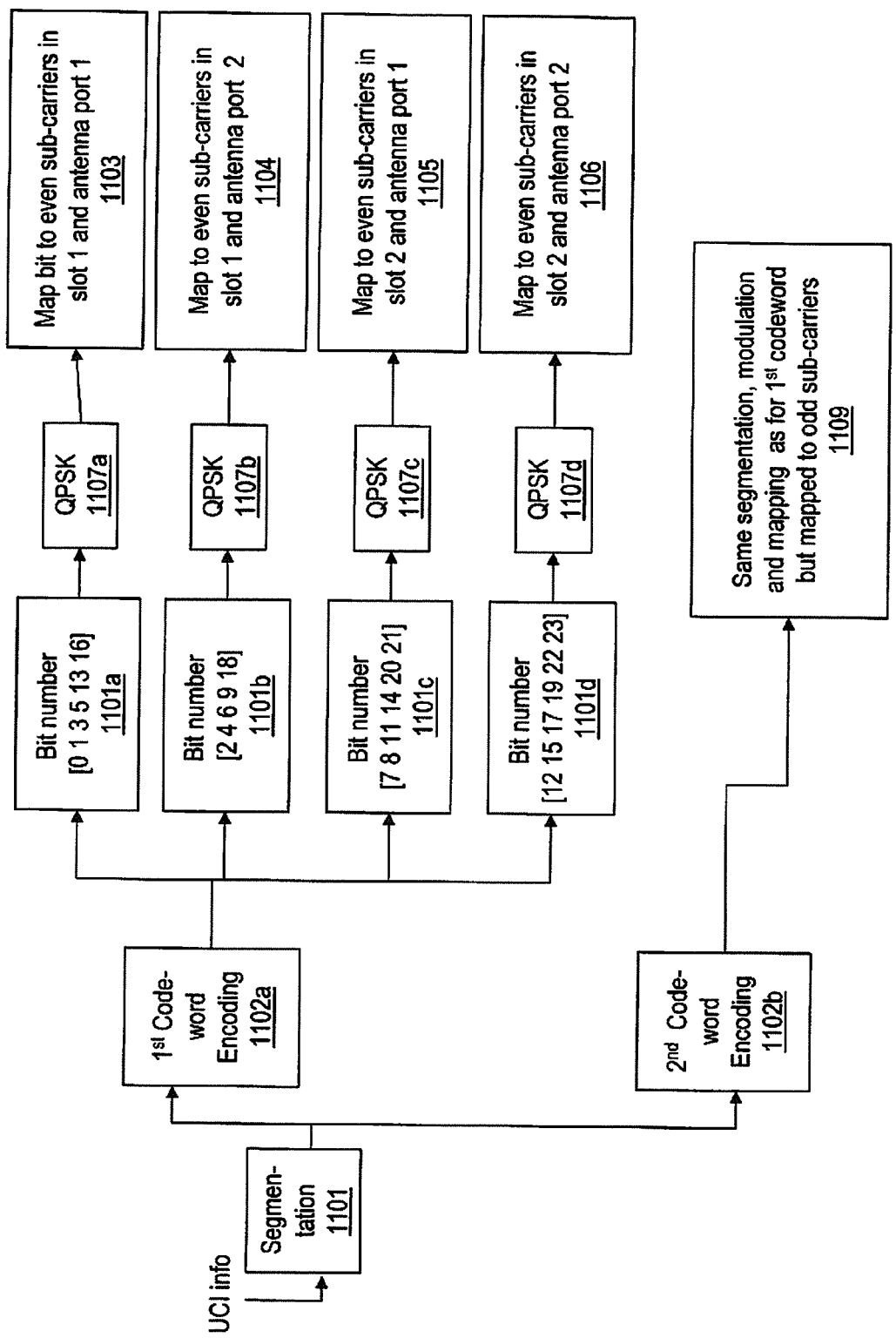
FIG. 11 is a block diagram of a system to encode and map UCI bits onto odd and even numbered subcarriers according to a fourth embodiment.

The segmentation unit 1101 of FIG. 11 is designed such that the minimum Hamming distance to the all zero codeword taken over all codewords is nonzero for as many of such segments as possible. One example of a bit segmentation unit having this property for the Release 10 dual RM encoder is one that maps the following output RM bits as follows:

To the first slot and first antenna port: [0 1 3 5 13 16]
To the first slot and second antenna port: [2 4 6 9 10 18]
To the second slot and first antenna port: [7 8 11 14 20 21]
To the second slot and second antenna port: [12 15 17 19 22 23]

This bit segmentation maximizes the obtained diversity order. The four segments or sets of bits may be swapped for the slots or antenna ports upon which they are transmitted. The six bits transmitted in a given slot and a given antenna port may be re-ordered arbitrarily without changing the optimized diversity properties. All such rearrangements may be provided by simple modification of the segmentation unit.

FIG. 11 is a hardware block diagram of hardware or firmware suitable for implementing version 4. In FIG. 11 UCI information is again applied to a segmentation engine 1101 to create two feeds into respective RM encoders 1102a, 1102b. The products of these encoders are each applied to a respective set of mappers 1101a, 1101b, 1101c, 1101d for the upper branch and a similar set of mappers 1109 for the lower branch. These mappers implement the mapping described above. the symbols are mapped into four groups, corresponding to two slots and two antennas. In the illustrated example, there are 24 bits {0, 23}. 6 bits are assigned to each group according to the functions and variations described above. FIG. 11 shows a separate mapper 1101a, 1101b, 1101c, 1101d for each of the four groups. These mappers may be in the form of registers and simple logic gates or in more complex or flexible hardware. The lower segment is mapped similarly as represented by the single mapper 1109.

From the mappers, each resulting bit sequence is applied to a respective QPSK encoder 1107a, 1107b, 1107c, 1107d to be encoded into symbols. Each symbol sequence is then mapped in a second set of mappers 1103, 1104, 1105, 1106 to a particular set of sub-carriers in a particular slot and to an antenna port in the pattern described above. As with FIGS. 8, 9, and 10, after the mappers, the mapped symbols are applied to a transmitter to be sent in the respective slot and antenna.

Version 5

If the reception of a PUCCH Format 3 transmission is interfered with by another UE transmitting the same PUCCH Format 3, it is useful if different segmentation approaches are used for different UEs, i.e. the interleaver is UE specific or specific for a group of UEs. This improves the detection performance and could be a relevant scenario when so-called same cell solutions are adopted (several transmission points in an area behave as a single base station with their antennas spaced far apart, even up to hundreds of meters).

For the segmentation described in version 4 above, UE specific modifications (without loss of performance) may be obtained by (but not limited to) re-arranging the order of the bits of each segment and/or re-arranging the mapping of segments to slots/antenna ports swapping the segments mapped to the different slots.

Figure 12:
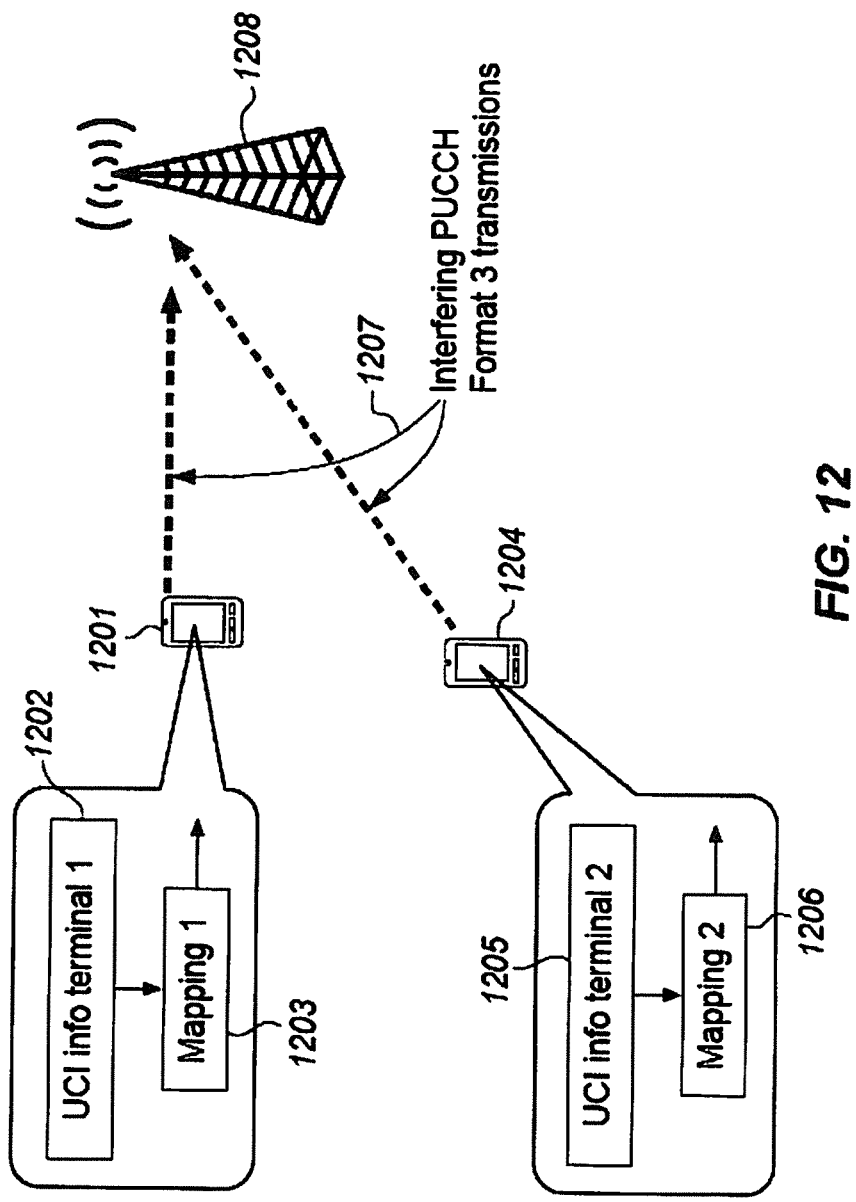
FIG. 12 is a system diagram of two different user equipments simultaneously sending UCI bits to a fixed node according to an embodiment.

FIG. 12 shows two different UEs 1201, 1204, presented in this example as mobile telephones or slate computers, communicating uplink information to an eNB 1208. The two transmissions, if overlapping, may interfere 1207.

The first UE 1201 contains UCI information 1202 and mapping hardware 1203 as presented in one or more of the examples above or below. Similarly, the second UE 1204 contains UCI information 1205 and mapping hardware 1206. Regardless of the specific values for the UCI information, the mapping 1203 for the first UE 1201 is different from the mapping 1206 for the second UE. As a result, interference between overlapping transmissions may be reduced.

Version 6

If the UE is equipped with only a single antenna, an optimized bit segmentation unit may improve the performance of PUCCH Format 3. In particular, using this segmentation, full frequency hopping diversity may be achieved even when the payload size is 21 bits.

The interleaver is designed such that the minimum Hamming distance to the all zero codeword taken over all code words is nonzero in both slots. A segmentation scheme having this property for the Release 10 dual RM encoder is one that maps the following output RM bits as follows:

To the first slot: [0 1 3 5 13 16 2 4 6 9 10 18]
To the second: [7 8 11 14 20 21 12 15 17 19 22 23]

The two sets of bits may be swapped between the slots in which they are transmitted. In addition, the twelve bits transmitted in a given slot may be re-ordered arbitrarily without changing the optimized diversity properties.

The described transmit diversity schemes for DFT-S-OFDM PUCCH above provide substantial link performance gains. These operations may be performed in hardware similar to that of FIG. 6A or 6B which may be implemented in a general controller or dedicated specialized hardware.

Figure 13:
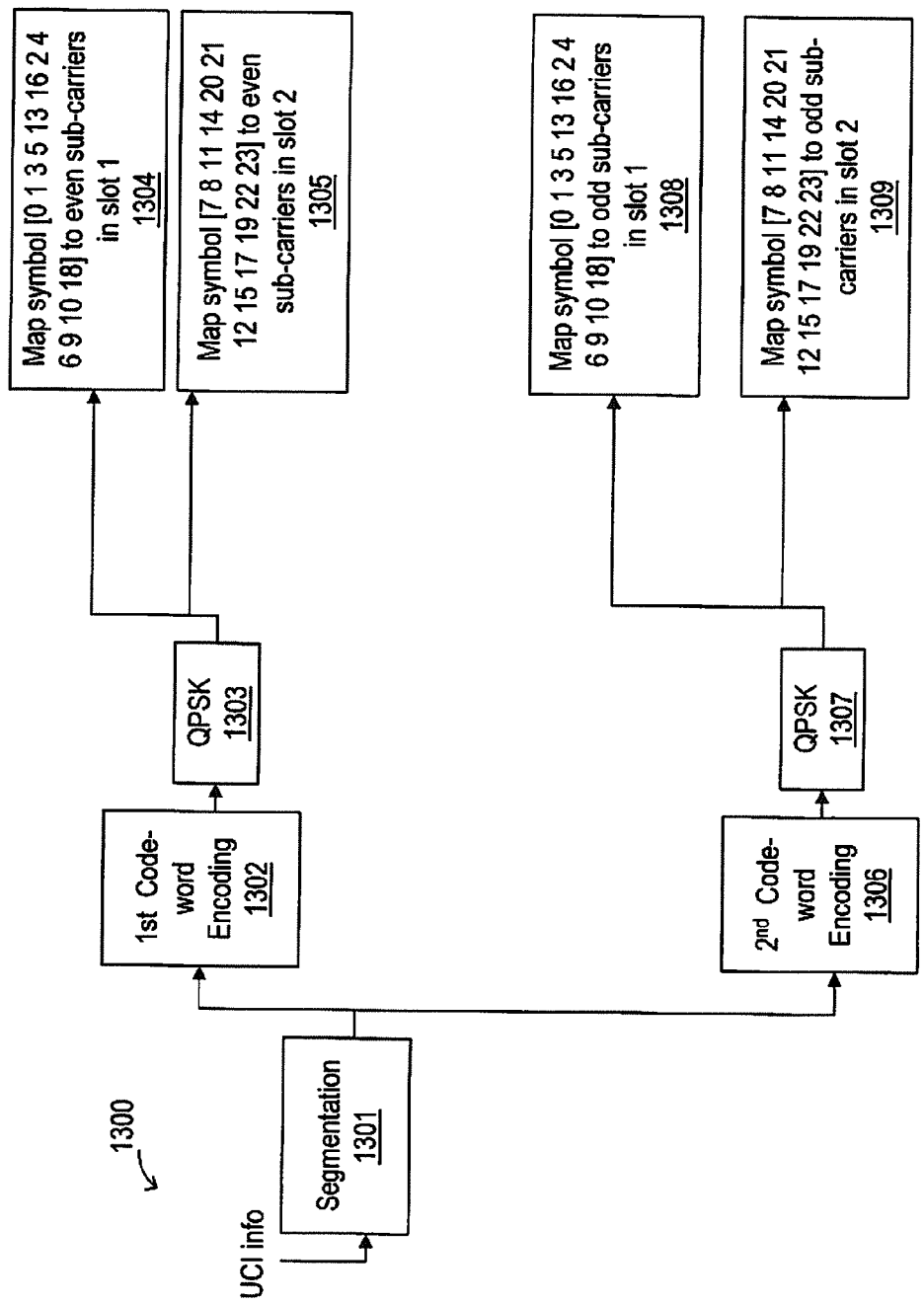
FIG. 13 is a block diagram of a system to encode and map UCI bits onto odd and even numbered subcarriers according to a second embodiment.

FIG. 13 is a hardware block diagram of hardware or firmware suitable for implementing version 6. In FIG. 13 UCI information 1300 is again applied to a segmentation engine 1301 to create two feeds into respective RM encoders 1302, 1306. The products of these encoders are each applied to a respective QPSK encoder 1303, 1307. This part of the hardware is the same as that of FIGS. 9, 10, and 11. Each symbol sequence in the upper segment is then mapped in a respective mapper 1308, 1309 to even subcarriers of the two slots using a particular mapping relationship as indicated above. Similarly the lower segment is applied to mappers 1308, 1309 which map the symbols into the odd subcarriers using the pre-determined mapping relationship. This yields symbols assigned to even and odd subcarriers and first and second slots of the PUCCH that may be transmitted through a single antenna or through multiple antennas, depending on the particular implementation.

In the hardware diagrams of FIGS. 8, 9A, 9B, 10A, 10B, 11, 12, and 13, particular encoding, such as RM and QPSK is used, however, the encoding may be adapted to suit different implementations. In addition, an upper segment and a lower segment is shown and referred to. The positional relationship between the two segments has meaning only to aid in understanding the drawings. The two segments may be distinguished using any other desired terminology. In addition, the particular mapping patterns and groups are provided as examples. The mapping may be rearranged or reversed to suit particular implementations.

Bit Segmentation

The bit segmentation unit or interleaver may be designed to introduce optimized bit rearranging or interleaving methods such that coded bits are redistributed to capture the maximum achievable diversity orders. However, a straightforward search through all possible interleavers will be complex since there are $24!=6.2 \times 10^{23}$ bit rearranging candidates. This can be reduced as described herein.

Performance is affected by how the total minimum Hamming distance is distributed between the two slots for the single-antenna case or among the four segments for the dual-antenna case. Given the same set of coded bits in the same slot/segment, the ordering of these bits cannot affect the slot/segment Hamming distance. Hence, rearranging a group of code bits within the same slot/segment has no effect on the link performance. As a result, rather than an interleaver search, the candidates may be reduced to a bipartite or quad-partite assignment. In other words, the bit rearrangement concerns assigning the 24 coded bits into two or four subsets of equal size (for the single and dual antenna case respectively). This approach may be generalized to more than two antennas and/or more than two frequency segments, in which case it will turn into an M-partite assignment problem where M is the product of the number of frequency segments and antennas.

To further simplify implementation, a bit rearrangement optimized for single and dual antenna cases may be used. Therefore, a first bipartite search through $$\frac{1}{2}\binom{24}{12} = 1,352,078$$

candidates delivers an optimized bit rearrangement for the single antenna case described in Version 6. The bit segmentation ensures full frequency diversity for PUCCH Format 3 signals with payload sizes up to 21 bits.

A second bipartite search of $$\left[\frac{1}{2}\binom{12}{6}\right]^2 = 213,444$$

possible re-bi-partitioning of the two slots of the first optimized bit segmentation delivers the optimized bit segmentation for the dual antenna case described in Version 4. This bit segmentation captures the maximum achievable diversity order of 4L for payload sizes up to 12 bits and diversity order of 3L for payload sizes from 13 to 21 bits, where L is the number of diversity receive antennas at a receiver.

Figure 14:
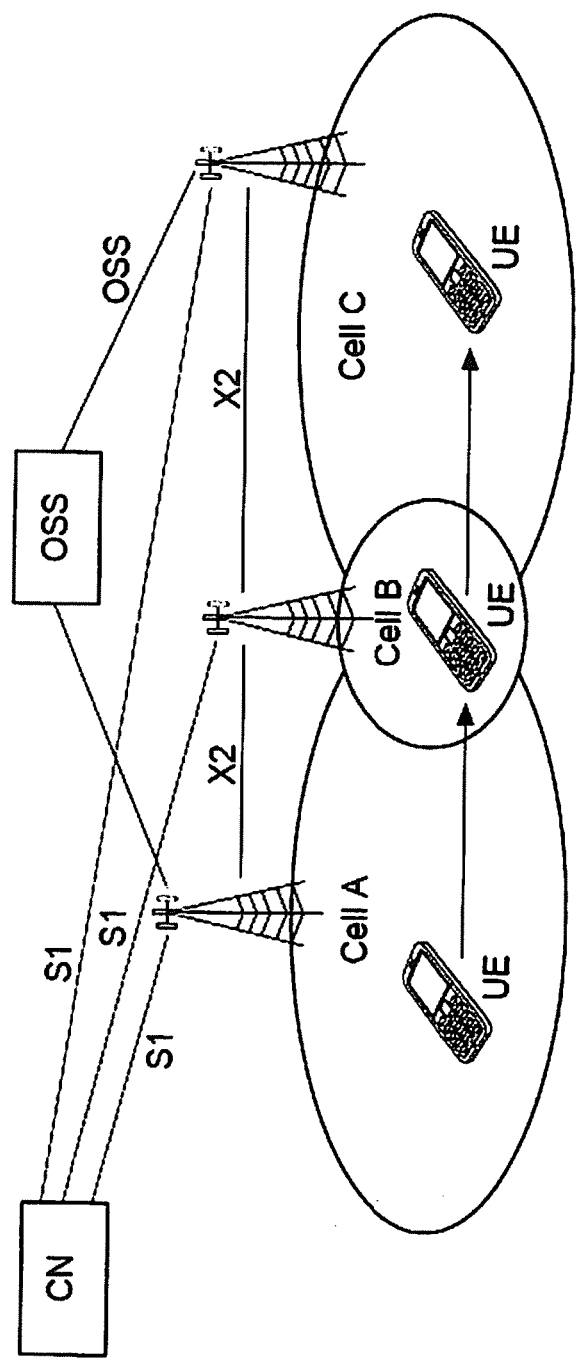
FIG. 14 is a system diagram of a user equipment in a radio communications system traversing from cell A to cell B.

FIG. 14 is a diagram of the general configuration of the radio communications system. In FIG. 14, a UE is moving from Cell A to Cell B and then to Cell C as indicated by the arrows pointing to the right in the figure. Each cell has a base station illustrated as a tower, such as an eNB, or similar structure near the center of each of the three cells. While the base stations are shown as being near the center of each cell, they may alternatively define the sides of each cell using sectorized antennas or be in any other desired configuration. In E-UTRAN, different user equipment terminals (UE) are wirelessly connected to radio base stations (usually referred to as evolved NodeB (eNB)) and send uplink control channel signals to one or more of the base stations. In E-UTRAN the radio base stations send downlink control channel signals to the UEs and are directly connected to a core network (CN) via an S1 interface which controls the eNBs connected to it. The eNBs are also connected to each other via an X2 interface. An Operation and Support System (OSS) is logically connected to all the radio base stations as well as to the CN, via an OSS interface.

Figure 15:
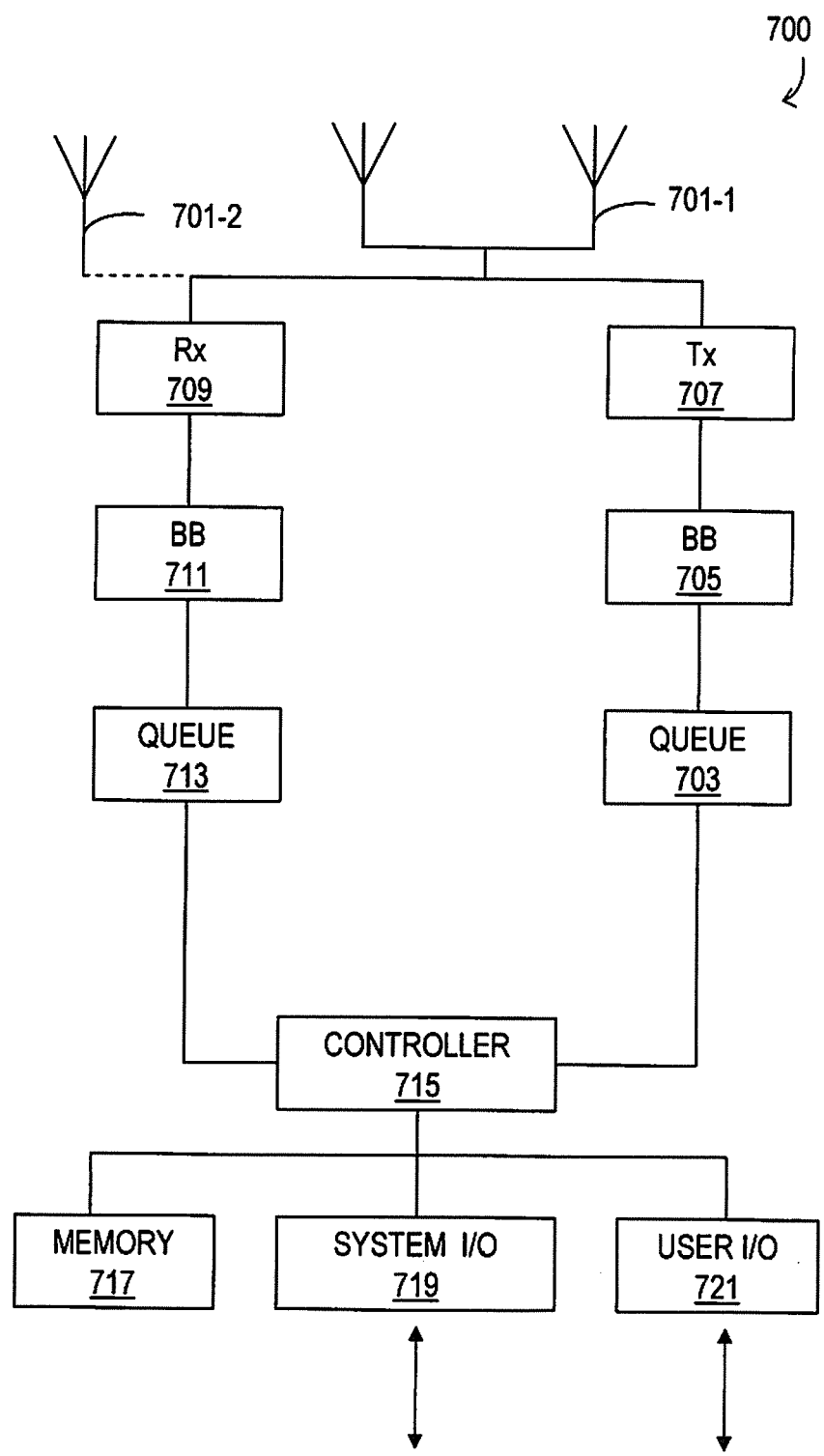
FIG. 15 is a hardware block diagram of a fixed or mobile node for sending or receiving uplink control information according to an embodiment.

FIG. 15 is an example hardware diagram of a device architecture suitable for the UE and for an eNB. The hardware 700 includes one or more antenna elements 701-1. An optional additional antenna element 701-2 is shown, for example, as connected to the transmit and receive chains by dotted line. There may be separate transmit and receive arrays, sectorized or diversity antennas or a single omnidirectional antenna element. For transmission, data is collected in a transmit queue 703 from which it is transferred to a baseband modulator 705 for conversion to symbols, modulation and upconversion. A transmitter 707 further modulates and amplifies the signal for transmission through the antenna.

On the receive side, received symbols are demodulated and downconverted to baseband in a receive chain 709. The baseband system extracts a bit sequence from the received signal and generates any error detection codes that may be needed. The bit stream is stored in a receive buffer or queue 713 for use by the system.

A controller 715 controls the operation of the receive and transmit chains, applies data to the outbound queue and receives data from the inbound queue. It also generates messages to support the wireless and wired protocols over which it communicates. The controller is coupled to one or more memory systems 717 which may contain software, intermediate cached values, configuration parameters, user and system data. The controller may also include internal memory in which any one or more of these types of information and data may be stored instead of or in addition to being stored in the external memory system. The controller is coupled to a system input/output interface 719 which allows for communication with external devices and a user input/output interface 721 to allow for user control, consumption, administration and operation of the system.

In the case of an eNB, the system interface 719 may provide access over the S1, OSS and X2 interfaces to the rest of the network equipment to send and receive data, messages, and administrative data. However, one or more of these interfaces may also use the radio interface 701 or another interface (not shown). In the case of a UE, the system interface may connect to other components on the device, such as sensors, microphones, and cameras, as well as to other devices, such as personal computers or other types of wireless networks, through wireless or wired interfaces.

Figure 16:
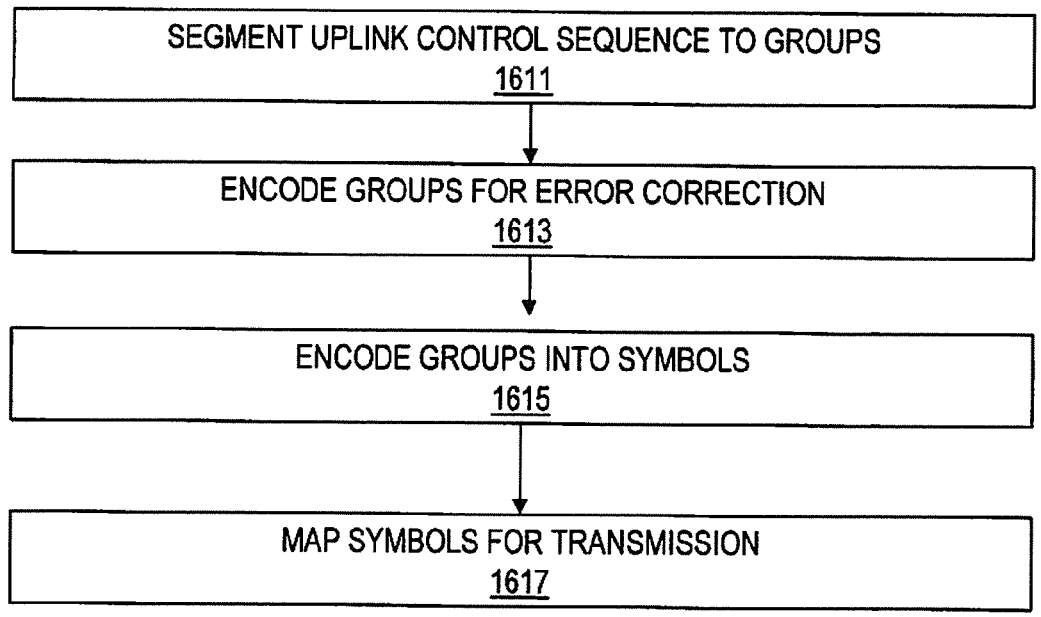
FIG. 16 is a process flow diagram of encoding and mapping UCI bits according to an embodiment.

FIG. 16 is a process flow diagram of the bit mapping and grouping processes shown in some of the hardware diagrams described above. In FIG. 16, user equipment (UE) of the radio communications system described above sends uplink control information to a serving node of the radio communications system using mapping and encoding to improve reception at the serving node. The UE generates an uplink control bit sequence or uplink control information (UCI) bit sequence. This sequence may be of any type, form, or length and examples are described in LTE and other standards. Adaptations for different length sequences are described above. The control bit sequence is segmented at 1611 to form at least two groups of bits. In the example hardware diagrams above, the UCI is always segmented into two groups. The particular format for the segmentation depends on the particular implementation.

At 1613 the two segments are each encoded for error detection or error correction depending upon the particular implementation. In the examples above there is a separate error correcting encoder for each segmented group. However the number and manner of encoders and encoding may be modified as necessary.

At 1615 the two groups of bits are encoded into symbols, such as QPSK symbols as shown in the examples above. The symbols are then rearranged at block 1617 and mapped to different ports for diversity transmission. The antenna ports transmit the symbols as uplink control information that can be received by the serving node.

The encoding of block 1615 may be onto different axes of a QPSK constellation so that two or four bits are combined to form each QPSK symbol. The bits for each symbol may come from the same or from different groups. So, for example, the odd bits from one of the two groups and the even bits from the other of the two groups can be applied to a single one of the QPSK encoders and combined to form symbols that have bits from both groups.

The symbols may then be mapped to ports at block 1617 in different ways as described above. So for example, symbols from one QPSK encoder may be applied to odd subcarriers and symbols from the second QPSK encoder may be applied to even subcarriers for transmission and the sub-carriers can be distributed to the two antenna ports according to a suitable diversity scheme. A portion of the odd subcarriers may be transmitted on a first of the two diversity antennas and another portion of the odd subcarriers may be transmitted on a second of the two diversity antennas. A similar approach may be applied to the even subcarriers. In addition, the mapping may include combining operations as shown in FIGS. 9 and 10.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a UE, an eNB, etc.). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touch screen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention is described in the context of UCI bits, the described segmentation mapping, encoding or grouping techniques may also be applied to other kinds of data. The invention is not limited to bits having any particular meaning nor to any types of signals. The described techniques may be applied to downlink data and control as well as to uplink data and control.

While the invention has been described in terms of several embodiments, those skilled in the art will recognize that the invention is not limited to the embodiments described, may be practiced with modification and alteration. The description is thus to be regarded as illustrative instead of limiting.

The invention claimed is:

1. A method implemented in a user equipment of a radio communications system to send uplink control information from the user equipment to a serving node of the radio communications system, the method comprising:
   segmenting an uplink control bit sequence to form a plurality of groups of bits;
   encoding the groups of bits in respective error correcting encoders, one for each group of bits;
   encoding the bits of each of the plurality of groups into symbols; and
   mapping the symbols to different transmission ports for diversity transmission as uplink control information through a plurality of antenna ports of the user equipment,
   wherein encoding the bits comprises applying bits from a first group of bits to one axis of a phase-shift keyed encoder and applying bits from a second group of bits to another axis of a phase-shift keyed encoder.

2. The method of claim 1, wherein mapping the symbols comprises applying symbols of the phase-shift keyed encoder to different ports for transmission.

3. The method of claim 1, wherein segmenting comprises segmenting into two groups of bits, wherein the phase-shift keyed encoder is a quaternary phase-shift keyed (QPSK) encoder, wherein encoding the bits comprises applying bits of both groups to each of two QPSK encoders, and wherein mapping the symbols comprises applying the output of each QPSK encoder to one of two different ports.

4. The method of claim 3, wherein encoding the bits comprises applying odd bits from one of the two groups and even bits from the other of the two groups to one of the QPSK encoders.

5. The method of claim 1, wherein encoding the bits comprises applying bits from a first group to a first phase-shift keyed encoder and applying bits from a second group to a second phase-shift keyed encoder and wherein mapping the symbols comprises mapping symbols from the phase-shift keyed encoder to odd subcarriers for transmission and mapping symbols from the second phase-shift keyed encoder to even subcarriers for transmission.

6. The method of claim 1, further comprising transmitting odd and even subcarriers from two different diversity antennas so that a portion of the odd subcarriers are transmitted on a first of the two diversity antennas and another portion of the odd subcarriers are transmitted on a second of the two diversity antennas.

7. The method of claim 1, wherein segmenting the bit sequence comprises segmenting the bit sequence to reduce a Hamming distance in the diversity transmission of the rearranged symbols.

8. The method of claim 7, wherein the diversity transmission is through a single antenna.

9. A radio terminal of a radio communications system operative to communicate uplink control information from the radio terminal to a serving node of the radio communications system, the radio terminal comprising:
   circuitry to segment an uplink control bit sequence into a plurality of groups of bits;
   circuitry to apply error correction encoding to each group of bits;
   circuitry to encode each of the plurality of groups into symbols; and
   circuitry to map the symbols to different antenna ports for diversity transmission as uplink control information through a plurality of antenna ports of the user equipment, wherein the circuitry to encode groups into symbols uses a phase-shift keyed encoding and applies bits from a first group of bits to one axis of a phase-shift keyed symbol and applies bits from a second group of bits to another axis of a phase-shift keyed symbol.

10. The radio terminal of claim 9, wherein the circuitry to segment the uplink control bit sequence segments the bits into two groups, wherein the circuitry to map the symbols utilizes quaternary phase-shift keyed (QPSK) encoding, and applies bits from both groups of bits to each of two QPSK encoders, and wherein the circuitry to map the symbols applies the output of each QPSK encoder to one of two different ports.

11. The radio terminal of claim 10, wherein the circuitry to encode the groups into symbols applies odd bits from one of the two groups of bits and even bits from the other of the two groups of bits to one of the QPSK encoders.

12. The radio terminal of claim 9, wherein the circuitry to encode the groups into symbols applies bits from a first group of bits to a first phase-shift keyed encoder and applies bits from a second group of bits to a second phase-shift keyed encoder and wherein the circuitry to map the symbols applies the encoded symbols from the phase-shift keyed encoder to odd subcarriers for transmission and applies symbols from the second phase-shift keyed encoder to even subcarriers for transmission.

13. The radio terminal of claim 9, wherein the circuitry to segment the uplink control bit sequence segments the bit sequence to reduce a Hamming distance in the diversity transmission of the rearranged symbols.

14. The radio terminal of claim 13, wherein a transmit chain of the diversity transmission has a single antenna for diversity transmission.

15. The radio terminal of claim 14, wherein the transmit chain transmit slot across multiple frequencies and time for diversity transmission.

16. A machine-readable medium having instructions stored thereon that when executed by the machine cause the machine to perform operations comprising:

segmenting an uplink control bit sequence to form a plurality of groups of bits;
encoding the groups of bits in respective error correcting encoders, one for each group of bits;
encoding the bits of each of the plurality of groups into symbols; and
mapping the symbols to different transmission ports for diversity transmission as uplink control information through a plurality of antenna ports of the user equipment, wherein encoding the bits comprises applying bits from a first group of bits to one axis of a phase-shift keyed encoder and applying bits from a second group of bits to another axis of a phase-shift keyed encoder and wherein mapping the symbols comprises applying symbols of the phase-shift keyed encoder to different ports for transmission.

17. The medium of claim 16, wherein encoding the bits comprises applying bits from a first group to a first phase-shift keyed encoder and applying bits from a second group to a second phase-shift keyed encoder and wherein mapping the symbols comprises mapping symbols from the phase-shift keyed encoder to odd subcarriers for transmission and mapping symbols from the second phase-shift keyed encoder to even subcarriers for transmission.

18. The medium of claim 16, wherein segmenting the bit sequence comprises segmenting the bit sequence to reduce a Hamming distance in the diversity transmission of the rearranged symbols.

* * * * *